US012139901B2

(12) United States Patent
Grody

(10) Patent No.: US 12,139,901 B2
(45) Date of Patent: Nov. 12, 2024

(54) PROGRAMMABLE TOILET FLUSH INITIATING, MONITORING AND MANAGEMENT SYSTEM AND METHOD THEREOF

(71) Applicant: HYDRAZE, INC., Potomac, MD (US)

(72) Inventor: Charles Dylan Grody, Potomac, MD (US)

(73) Assignee: Hydraze, Inc., Potomac, MD (US)

( * ) Notice: Subject to any disclaimer, the term of this patent is extended or adjusted under 35 U.S.C. 154(b) by 20 days.

(21) Appl. No.: 18/213,418

(22) Filed: Jun. 23, 2023

(65) Prior Publication Data

US 2024/0018767 A1 Jan. 18, 2024

Related U.S. Application Data

(63) Continuation of application No. 17/168,629, filed on Feb. 5, 2021, now Pat. No. 11,739,513, which is a continuation-in-part of application No. 16/251,235, filed on Jan. 18, 2019, now Pat. No. 10,941,552.

(60) Provisional application No. 62/620,425, filed on Jan. 22, 2018.

(51) Int. Cl.
*E03D 5/10* (2006.01)
*E05B 17/00* (2006.01)
*E05B 65/00* (2006.01)

(52) U.S. Cl.
CPC ................ *E03D 5/10* (2013.01); *E05B 17/00* (2013.01); *E05B 65/0035* (2013.01)

(58) Field of Classification Search
CPC ........ E03D 5/10; E05B 17/00; E05B 65/0035
USPC .............................................................. 4/313
See application file for complete search history.

(56) References Cited

U.S. PATENT DOCUMENTS 1,875,983 A 9/1932 Bourdet et al.
2,688,141 A 9/1954 Filliung
2,786,210 A * 3/1957 Fraser ....................... E03D 3/04 4/DIG. 3
3,056,143 A * 10/1962 Foster ....................... E03D 5/10 4/313
4,692,951 A 9/1987 Taki et al.
6,018,827 A 2/2000 Shaw et al.
7,028,374 B2 4/2006 Fiocco
7,177,725 B2 2/2007 Nortier et al.
7,814,582 B2 10/2010 Reddy et al.
8,695,125 B2 4/2014 Funari et al.
9,447,625 B1 9/2016 Seebaransingh et al.
(Continued)

FOREIGN PATENT DOCUMENTS

GB 2165271 4/1986
GB 2488071 8/2012
(Continued)

OTHER PUBLICATIONS

International Preliminary Report on Patentability in Application No. PCT/US2019/014115, dated Aug. 6, 2020 (10 pgs.).
(Continued)

*Primary Examiner* — Huyen D Le
(74) *Attorney, Agent, or Firm* — ArentFox Schiff LLP; Joseph P. Quinn

(57) ABSTRACT

The present invention relates to a toilet flushing initiating, monitoring and management system initiated by the unlocking of a locking member on a door mounted in a stall typically found in a bathroom such as a public bathroom.

20 Claims, 8 Drawing Sheets

(56) References Cited

U.S. PATENT DOCUMENTS

| | | | | |
|---|---|---|---|---|
| 10,941,552 | B2 | 3/2021 | Grody | |
| 11,339,588 | B2 * | 5/2022 | Bromley | E05B 39/04 |
| 11,488,457 | B2 * | 11/2022 | Chakraborty | G08B 5/221 |
| 11,739,513 | B2 | 8/2023 | Grody | |
| 11,866,922 | B2 * | 1/2024 | Grody | E03D 5/105 |
| 2002/0162166 | A1 | 11/2002 | Saar et al. | |
| 2005/0171709 | A1 | 8/2005 | Nortier et al. | |
| 2006/0130223 | A1 | 6/2006 | Yen | |
| 2008/0072369 | A1 | 3/2008 | Funari et al. | |
| 2009/0119142 | A1 | 5/2009 | Yenni et al. | |
| 2012/0317709 | A1 | 12/2012 | Oates | |
| 2014/0020166 | A1 | 1/2014 | Metcalf et al. | |
| 2014/0264110 | A1 | 9/2014 | Wilson et al. | |
| 2015/0233146 | A1 | 8/2015 | Klevens et al. | |
| 2017/0051486 | A1 | 2/2017 | Schomburg et al. | |
| 2018/0066422 | A1 | 3/2018 | Allard, III | |
| 2018/0135285 | A1 | 5/2018 | Canfield et al. | |
| 2019/0089550 | A1 | 3/2019 | Rexach et al. | |
| 2021/0222416 | A1 | 7/2021 | Grody | |

FOREIGN PATENT DOCUMENTS

| | | | |
|---|---|---|---|
| JP | H0729074 | | 6/1995 |
| JP | H09221805 | | 8/1997 |
| JP | 2004285729 | | 10/2004 |
| JP | 2006177064 | | 7/2006 |
| JP | 2012022367 | | 2/2012 |
| JP | 2013072261 | | 4/2013 |
| JP | 2014214594 | | 11/2014 |
| JP | 2018009289 | | 1/2018 |
| JP | 2019141306 | | 8/2019 |
| KR | 930000595 | | 2/1993 |
| KR | 20110104238 | A | 9/2011 |
| WO | 2008046070 | | 4/2008 |
| WO | 2017031473 | | 2/2017 |
| WO | 2019143879 | | 7/2019 |

OTHER PUBLICATIONS

International Search Report and Written Opinion in Application No. PCT/US2019/014115 dated Apr. 9, 2019.

International Search Report and Written Opinion in Application No. PCT/US2020/013866 (Oct. 1, 2020).

International Search Report and Written Opinion in Application No. PCT/US2022/053847, dated Aug. 23, 2023, 18 pages.

Office Action in JP Application No. 2020-560878, dated Nov. 4, 2022 with English translation (11 pgs.).

Decision to Grant in JP2020-560878 dated May 16, 2023 (3 pages).

Notice of Submission of Opinion in Korean Application No. 10-2020-7022913 dated May 30, 2023 [English translation], 7 pages.

Communication pursuant to Article 94(3) EPC in Application No. 19703565.2 dated Jul. 19, 2023 (5 pages).

Notice of Reasons for Rejection in Japanese Application No. 2022-538901 dated Oct. 3, 2023 (with English translation), 7 pages.

Notice of Submission of Opinion in Korean Application No. 10-2020-7022913 dated Dec. 19, 2023 [with English translation], 7 pages.

* cited by examiner

PROGRAMMABLE TOILET FLUSH INITIATING, MONITORING AND MANAGEMENT SYSTEM AND METHOD THEREOF

CROSS REFERENCE TO RELATED APPLICATIONS

This application is a Continuation of and claims priority to U.S. patent application Ser. No. 17/168,629, filed on Feb. 5, 2021, which is a Continuation-in-part of and claims priority to U.S. patent application Ser. No. 16/251,235, filed on Jan. 18, 2019, which claims priority to, and benefit of U.S. Provisional Application No. 62/620,425 filed on Jan. 22, 2018, the contents of each of which are incorporated herein by reference.

TECHNICAL FIELD OF THE INVENTION

The present invention relates to a system for managing toilet flushing and monitoring wastewater consumption in toilets, for example, toilets in bathroom stalls, typically found in locations that accommodate a large number of people such as but not limited to airports, college campus buildings, public buildings, sports arenas, and entertainment events.

BACKGROUND

Public bathrooms such as those found in offices, schools, airports, and parks, for example, have toilets located in stalls to maintain privacy for the user. Users typically lock the stall door following entry and unlock the stall door upon exit.

In toilets designed to serve a large number of people, there are two standard types of toilet flushing mechanisms: manual flushing such as a toilet handle, lever, or button and automatic flushing initiated by a sensor and an automated flushing mechanism.

In manual flushing, toilets have a handle, lever, or button that is actuated manually and is operably joined to a flushing mechanism that flushes the toilet when actuated. This method relies entirely on the user to intentionally cause the toilet to flush which can be problematic for locations where high sanitation standards are required. Users are often not motivated to flush the toilet because, for example, flushing requires extra time and effort or risks contamination of the user to produce a consequence that to the user is personally insignificant.

To mitigate the problem in which users fail to flush, many facilities have installed automatic flush toilets. Automatic flush toilets typically have infrared or ultrasonic sensors that detect the distance between the user and the toilet. When the user enters the stall and then leaves moving away from the toilet, a sensor detects that a predetermined distance between user and toilet is met, and the sensor triggers the toilet to flush.

Automatic toilet flushing systems are very popular and are even required in certain places. These systems keep toilets clean and reduce the incidence of germ transfer and the possibility of transmitting transmissible diseases. Disadvantageously, automatic flushing toilets sometimes do not flush enough or, more commonly, flush too often. Actions such as hanging up a coat, placing down a backpack, or lining a seat with toilet paper may cause the user to unintentionally or unnecessarily trigger the automatic toilet flushing sequence. Extra flushes, particularly for toilets in public bathrooms that may be used hundreds or even thousands of times in a day, can accumulate significantly over time and create a significant amount of water waste.

SUMMARY OF THE INVENTION

The primary advantage of the present invention is water saving by significantly more accurately determining when the toilet should be flushed and the frequency with which the toilet has been used compared to the currently existing automatic toilet flushing systems. Prior art systems measure the user's distance from the toilet, which is not an effective predictor of when and if the user has used the toilet due to errors in determining whether a user has actually used the toilet or is engaged in some unrelated behavior as discussed above. The best indicator of toilet use and water consumption is the unlocking of the toilet stall door to open the door so that the user may exit the stall. Because the present invention is based on the reliability of the user to unlock the stall door as the sole indicator that the toilet has been used, the invention uses the stall door unlocking action to determine when to flush the toilet. Accordingly, because no other user behavior initiates any unintentional flush, the likelihood that the toilet will flush and flush only once, as necessary, for each toilet use is improved. Not only is the level of sanitation of the toilet improved compared to existing systems, the number of unnecessary flushes resulting in excessive and undesirable water waste use is markedly limited.

A second key advantage of the present invention is that flushing does not require the user to be inconvenienced. Because users almost always lock and unlock the stall door to maintain privacy, by modifying the locking-unlocking steps to trigger the toilet to flush, the toilet will flush as the user leaves the toilet stall without any additional effort on the part of the user.

Optionally, a sign may be added to the inside or outside of the stall door informing the user that the toilet has been equipped to flush automatically when the stall door is unlocked thereby avoiding or reducing inadvertent manual flushing by the user.

A third key advantage of the present invention is that it includes the same sanitary benefits associated with sensor based automatic toilet flushing systems.

According to one aspect, the invention relates to a system for managing toilet flushing in a bathroom stall. The system comprises a door locking member, a toilet flushing controller and a toilet flushing actuator.

In one embodiment of the invention, the door locking member of the system includes a door lock chamber, typically attached to a stall post, a slider typically attached to the stall door and aligned with the door lock chamber, a housing enclosing a signal emitter associated with the door locking member, the signal emitter configured to send a wireless signal to a flush signal receiver associated with a toilet flushing mechanism comprising a toilet flushing controller and a toilet flushing actuator. The locking member further includes a sensor for sensing the position of the slider, a door housing controller for receiving input from the sensor and initiating the sending of a signal by the signal emitter to the flush signal receiver, and one or more batteries and an SD card enclosed in the housing typically having a cover. The door housing controller further can optionally regulate the function of the batteries and SD card. The SD card can store data received from the door housing controller optionally including without limitation sensor input and signal emitter output.

The slider is capable of translating from a first position to a second position and comprises a first, or proximal end, and an opposite second, or distal end. In the slider first position the slider first end is inserted in the door lock chamber and in the second position the slider first end is positioned outside of, i.e., is free of, the door lock chamber. The stall door cannot open unless the slider is in the second position. The sensor is configured for sensing the slider when the slider is in the second position, and is operatively connected to the signal emitter, communicating the detected position of the slider to the door housing controller. The door housing controller triggers the signal emitter to send a signal to the flush signal receiver. The toilet flushing controller is operatively joined to the flush signal receiver.

The toilet flushing actuator is controlled by the toilet flushing controller.

The signal emitter is configured to transmit to the flush signal receiver a signal, e.g., a Bluetooth® or radio frequency signal, upon sensing the signal sent from the sensor to the door housing controller that the sensor has detected that the slider has been translated to the second position, the toilet flushing controller configured to control the flushing actuator to initiate a single flush when the stall door is unlocked.

In one embodiment, the system further comprises a system controller configured to set intervals of time between 5 seconds to 240 seconds during which a flush can be activated. The system controller is capable of communicating with both the door housing controller and the toilet flushing controller wirelessly or through hardwire connection. The system controller is capable of setting the duration of flushing intervals for all toilets in the bathroom and/or the duration of flushing intervals for all toilets in a building and may be configured to prevent any toilet from flushing for a period of 5-240 seconds after its previous flush.

In another embodiment according to the invention, the system further comprises a toilet handle, lever, or button for manually flushing the toilet, and/or one or more photovoltaic cells or batteries for energizing one or more of the sensor, door housing controller, signal emitter, flush signal receiver, toilet flushing controller, and toilet flushing actuator.

In another aspect, the invention relates to a method for managing toilet flushing in a bathroom stall. In one embodiment, the method includes receiving a wireless signal from a signal emitter in a stall door latch, the wireless signal indicating a retraction of the slider in the stall door locking member and triggering a flushing actuator to initiate flushing of a toilet in response to receiving the wireless signal.

In another embodiment, the method for managing toilet flushing in a bathroom stall includes sensing a retraction of a stall latch slider by a sensor; and emitting a wireless signal by a signal emitter in response to sensing the retraction by the slider, wherein the wireless signal is matched to a flush signal receiver. This method may further include receiving the wireless signal by the flush signal receiver and triggering a flushing actuator by a toilet flushing controller in communication with the flush signal receiver in response to the receiving of the wireless signal by the flush signal receiver.

In still another embodiment, the method for managing toilet flushing in a bathroom stall comprises providing a device comprising a door locking member comprising a slider having a first end and a second end opposite the first end, a signal emitter, and a sensor, a flush signal receiver; a toilet flushing controller; and, a toilet flushing actuator. Additionally the method includes transmitting by the signal emitter to the flush signal receiver, a signal upon the detection of the position of the second end of the slider by the sensor, controlling the toilet flushing actuator by the toilet flushing controller, initiating by the toilet flushing controller a single toilet flush by the toilet flushing actuator when the slider second end position is detected by the sensor; and, optionally, recording the frequency of slider operation by a door housing controller onto the SD card.

DESCRIPTION OF THE INVENTION

The present solution without sacrificing user functionality or convenience addresses drawbacks such as too few or too many flushes characteristic of current toilet flushing mechanisms. The present solution is a device and a method thereof that initiates a toilet flushing sequence by the unlocking of a toilet stall door.

As used herein, a stall may be any walled enclosure with or without a roof or ceiling having a door and any number of sides that will provide sufficient privacy to the typical toilet user to encourage its use and may be any shape including but not limited to rectangular, pyramidal, cylindrical, and trapezoidal.

The invention disclosed herein is directed to a toilet flush management system and an automated toilet flushing system that does not require manual flushing of a toilet. Manual flushing of a toilet is an option that can be included with the present invention.

Figure 1A:
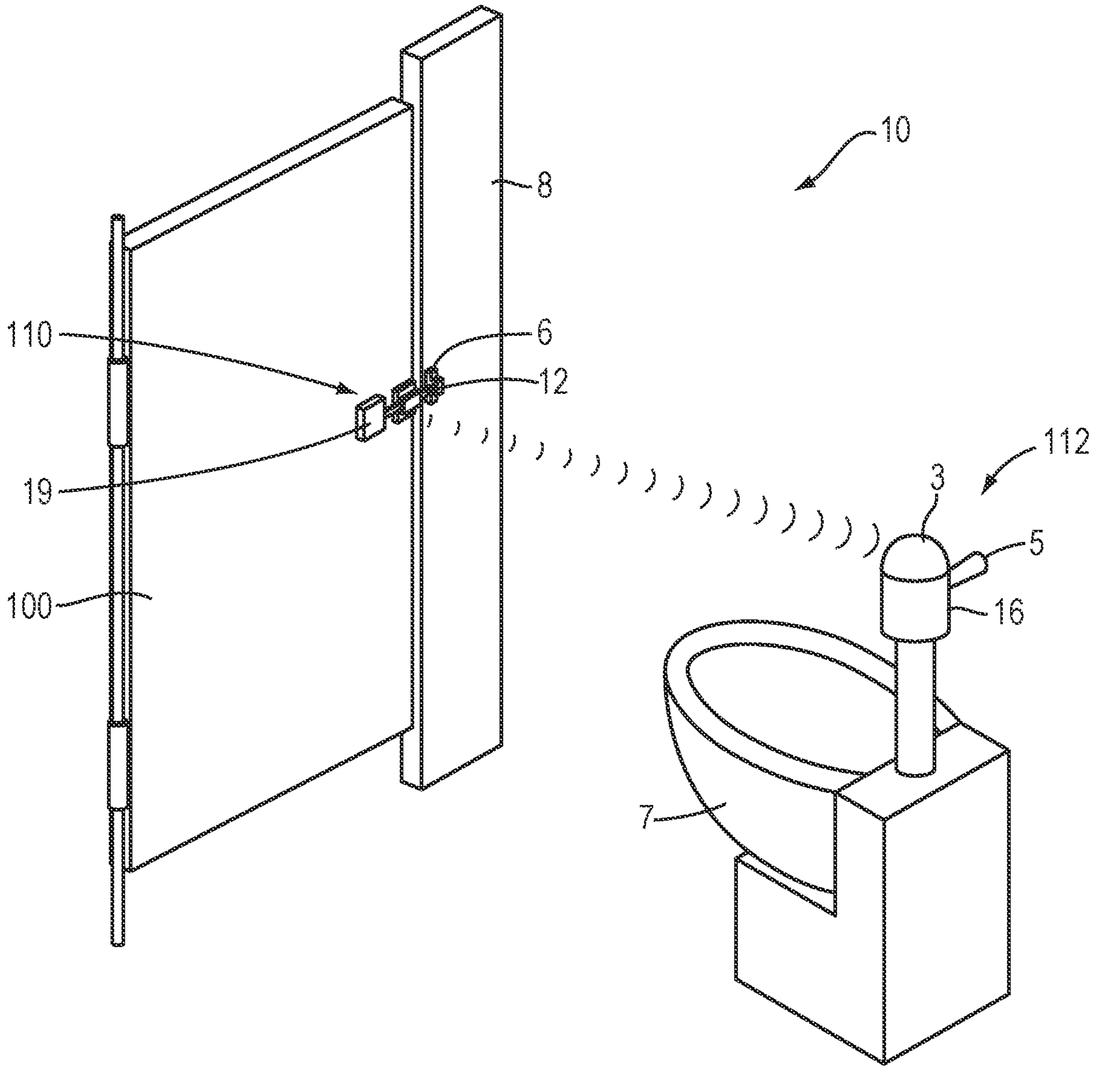
FIG. 1A illustrates an embodiment of the automatic toilet flushing system according to the invention.

FIGS. 1A-1D illustrate the toilet flushing management system. The overall scheme of the toilet flushing management system 10 is illustrated in FIG. 1A. The system 10 includes a stall door locking member 110 affixed to the door 100 of a stall housing a toilet 7, hereinafter toilet stall.

The system 10 further includes a toilet flushing mechanism 112 comprising a flush signal receiver 3, a flush actuator 5 and a toilet flushing controller 16 associated with the toilet flushing actuator 5 for initiating a flush by the toilet 7.

Figure 1B:
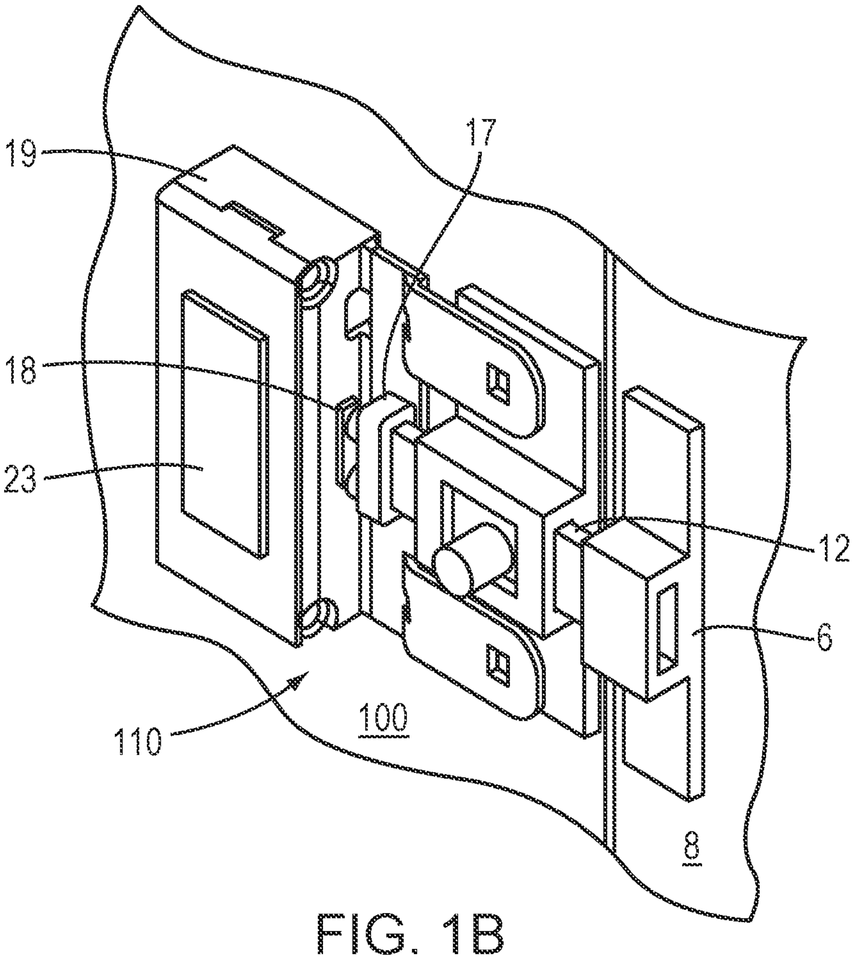
FIG. 1B is an illustrative isometric view of one embodiment of the stall door locking mechanism illustrated in FIG. 1 according to the invention.
Figure 1C:
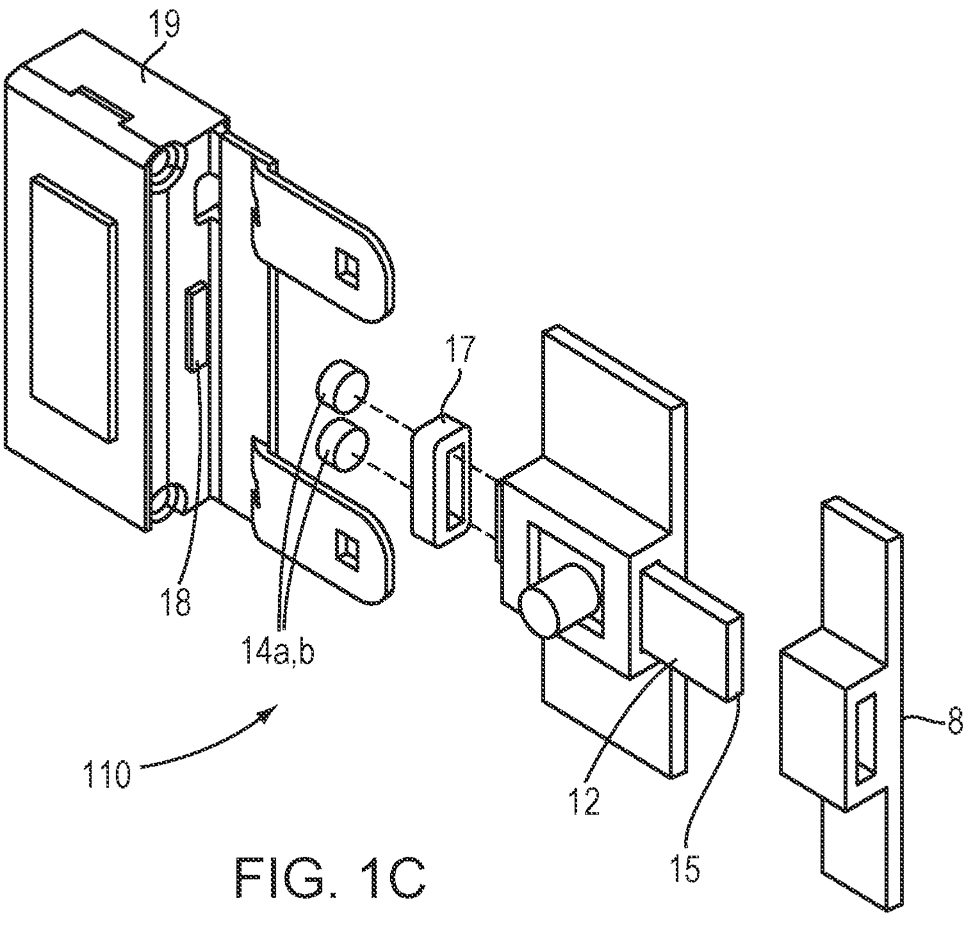
FIG. 1C is an exploded view of the device illustrated in FIG. 1B.
Figure 1D:
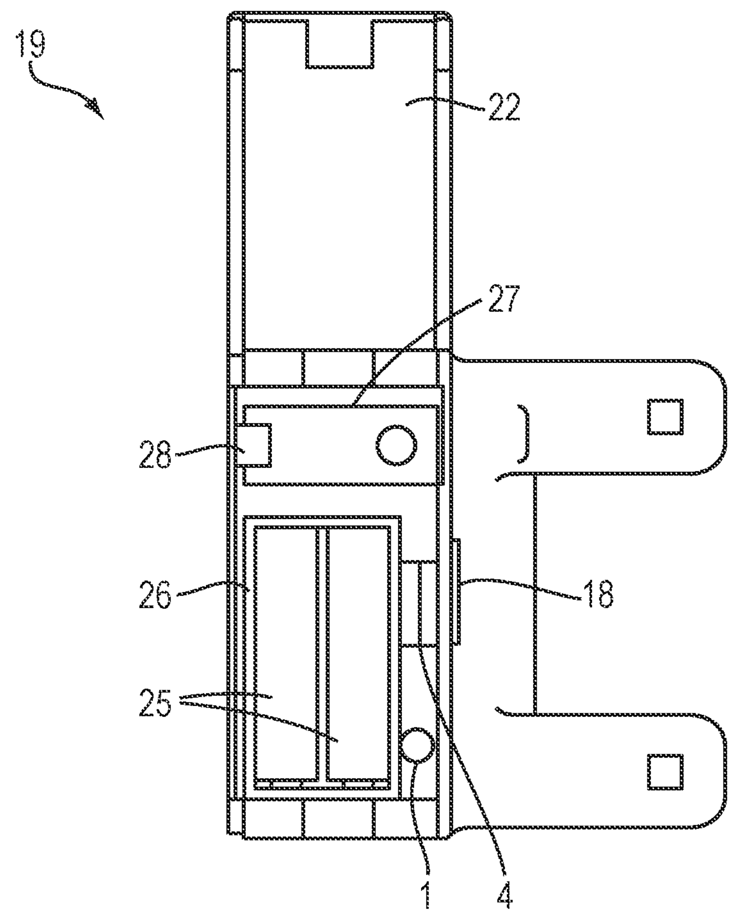
FIG. 1D is an open front view of an exemplary housing enclosing the electronic components of the locking mechanism illustrated in FIG. 1B.

Referring to FIGS. 1B-1D, the locking member 110 includes a slider 12, a housing 19 enclosing a sensor 4 for sensing slider position, a signal emitter 1 for transmitting a signal to the flush signal receiver 3 associated with the toilet flushing mechanism 112, a door housing controller 27, a battery compartment 26 enclosing one or more batteries 25, an SD card 28, and a cover 22. The locking member 110 further includes a lock chamber 6, positioned on a stall post 8. The lock chamber 6 is aligned with the slider 12.

Figure 2A:
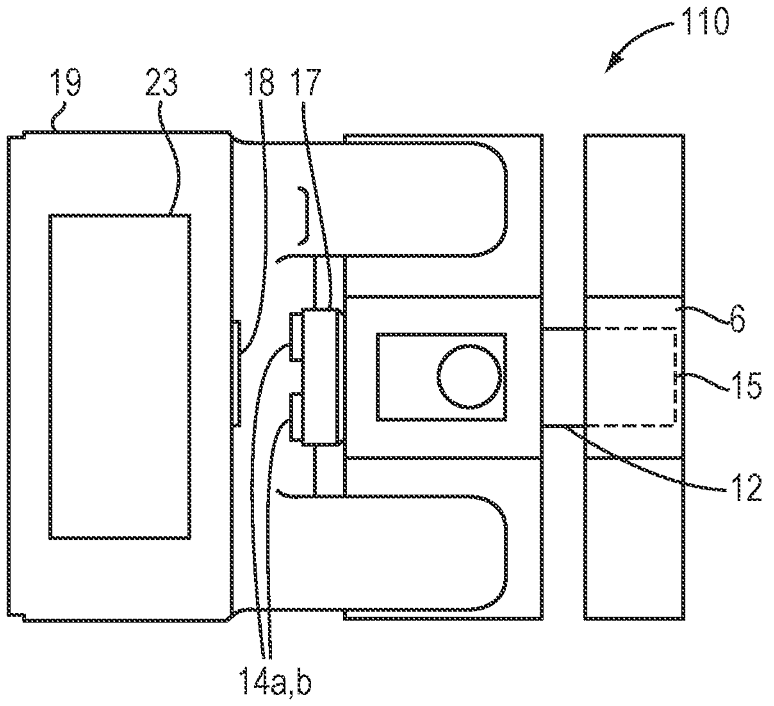
FIG. 2A illustrates an embodiment of the stall door slider lock in the closed (first) position of the embodiment of the toilet flushing system illustrated in FIG. 1B according to the invention.
Figure 2B:
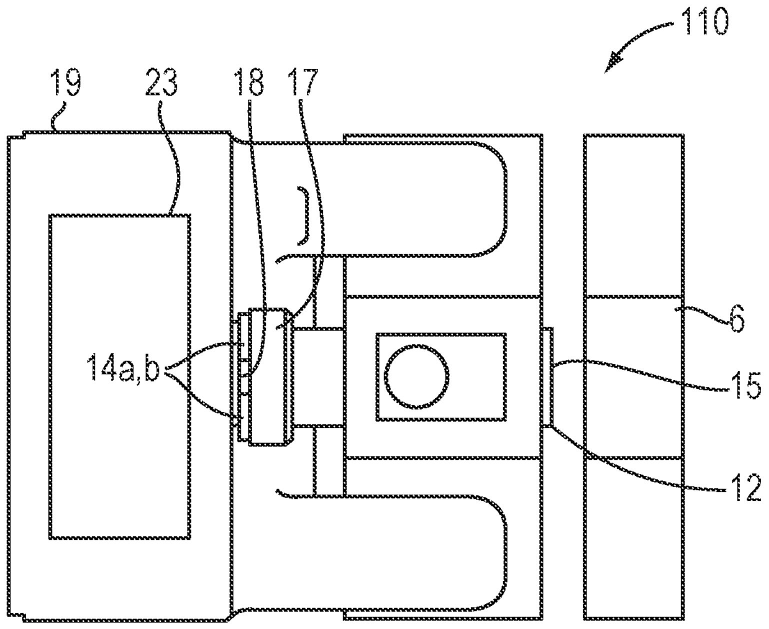
FIG. 2B illustrates an embodiment of the stall door slider lock in the open (second) position of the embodiment of the toilet flushing system illustrated in FIG. 1B.

Referring to FIGS. 2A and 2B, the slider 12 is capable of manual reciprocal movement between a first (closed) position and a second (open) position. In the first position, illustrated in FIG. 2A, proximal end 15 of the slider 12 is inserted in the lock chamber 6 when the stall door 100 is closed and locked. The proximal end 15 of the slider 12 cannot be inserted in the lock chamber 6 unless the stall door 100 is closed.

In the second position illustrated in FIG. 2B, the proximal end 15 of slider 12 that was inserted in the chamber 6 illustrated in FIG. 1A is positioned outside, i.e., free of, the lock chamber 6. In the second position, a distal end 17 of the slider 12 opposite to slider proximal end 15, contacts and/or is sensed by the sensor 4 initiating a signal from signal emitter 1 enclosed within the housing 19 (FIG. 1D) to emit a signal that is transmitted to flush signal receiver 3 positioned on the toilet or associated toilet plumbing when the stall door 100 is open.

Each time a stall door is unlocked by moving the slider 12 from the first position where proximal end 15 of the slider 12 is positioned in the lock chamber 6, to the second position where the proximal end 15 of the slider 12 is free of the chamber 6, the opposite distal end 17 of the slider 12 contacts and/or is sensed by the sensor 4. The sensor 4 upon contact with and/or sensing distal end 17 of slider 12 triggers the signal emitter 1 to send a wireless signal such as a radio frequency or Bluetooth® signal or a hardwire signal to the flush signal receiver 3 triggering the toilet flushing controller 16 operatively joined to the flushing actuator 5 on the toilet 7 to initiate a flush.

The sensor 4 can be a variety of different sensors or a combination of sensors. Examples of possible sensors include but are not limited to: contact sensors, magnetic proximity sensors, vibration sensors, infrared sensors, or ultrasonic sensors.

In one embodiment of the invention, a contact sensor 4 is positioned in or on the housing 19 or on the stall door 100 such that every time the slider 12 is transferred from the first position to the second position, the slider 12 makes physical contact with the sensor 4. Such contact signals flush actuation.

In another embodiment, a magnetic proximity sensor 4 positioned in or on the housing 19 or on the stall door 100 is used to detect the presence of a magnet or magnetized material, e.g. piece of metal 14_a,b_ affixed to the slider 12. Upon transfer of the slider 12 to the second position, the magnet or magnetized piece of metal 14_a,b_ triggers the magnetic proximity sensor 4, signaling flush actuation. The number of magnets or magnetized materials are not limited to those illustrated.

In still another embodiment, a vibration sensor 4, similar to the contact sensor, is positioned in or on the housing 19 or on the stall door 100 such that every time the slider 12 is transferred from the first position to the second position, the slider 12 makes physical contact with the sensor 4. The vibration sensor 4 detects the impact of the slider 12 signaling flush actuation.

In yet another embodiment, an infrared sensor 4 is affixed in or on the housing 19 or on the stall door 100. The infrared sensor 4 emits an infrared signal to detect the distance of nearby objects. The infrared sensor is attuned to detect the distance of the slider 12 from the sensor such that it triggers flush actuation upon the movement of the slider 12 from first position to second position.

In yet another embodiment, an ultrasonic sensor 4 is affixed in or on the housing 19 or on the stall door 100. The sensor 4 detects sound waves reflected back by nearby objects, thereby allowing the sensor to register distance. For example, the sensor 4 detects sound waves reflected back by slider 12 depending on the distance of the slider 12 from the sensor 4. Based on a predetermined distance between the slider 12 and the sensor 4, flush actuation would be initiated following translation of the slider 12 from the first position to the second position.

Each locking member signal emitter 1 is matched to a corresponding toilet flush signal receiver 3 and uses unique signals that differ from other of the signal emitters 1 and flush signal receivers 3 in other nearby systems 10, for example, other systems 10 in the same bathroom. By the application of unique signals, one signal emitter 1 is prevented from activating the flushing system of other toilets to flush.

In one embodiment of the invention, the system 10 further includes a toilet flushing actuator 5 that initiates a flush to occur in the toilet 7. The system 10 described herein could either be retrofitted to current toilets and bathroom stalls as an attachment or manufactured directly onto a new toilet and applied to bathroom toilet stalls or to pre-fabricated bathroom toilet stalls.

Figure 3:
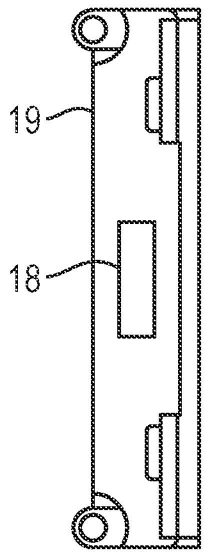
FIG. 3 illustrates a side view of the housing of the embodiment of the locking mechanism illustrated in FIG. 1B according to the invention.

FIG. 3 illustrates the location of a magnet or magnetizable plate 18 on the portion of the housing 19 that faces an end 17 of the slider 12 that is opposite to the insertable end 15 of the slider 12. The shape of the plate is not limited to the illustrated shape, as the shape could be rectangular, circular, triangular, trapazoidal or another shape. Magnetizable materials include but are not limited to iron, nickel, cobalt, rare-earth metals, and lodestone. The location of magnets or magnetizable materials and the number of magnets or magnetizable materials on the housing 19 are not limited to those illustrated.

Figure 4:
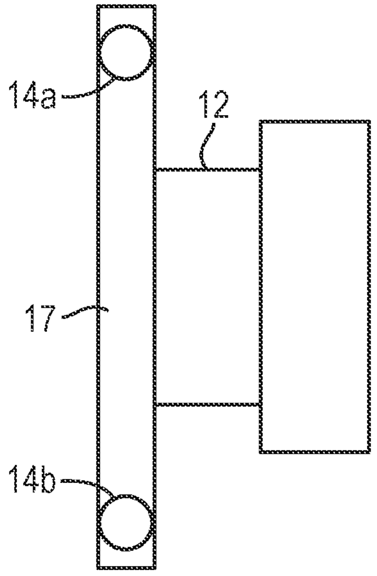
FIG. 4 illustrates a side view of a slider of the embodiment of the locking mechanism illustrated in FIG. 1B.

Referring now to FIG. 4, a side view of the slider 12 is illustrated. The location of slider magnets or magnetizable materials 14_a_ and 14_b_ on end 17 of slider 12 are positioned to magnetically interact with magnetic or magnetizable plate 18 on housing 19. The slider magnets or magnetizable materials 14_a_ and 14_b_ are aligned with the magnetic or magnetizable plate 18 of the housing 19 to (i) ensure that proper contact is made between the slider 12 and housing 19 such that the slider 12 is aligned with the sensor 4, (ii) prevent the slider 12 from bouncing back and forth upon the opening and closing of the stall door, and (iii) attract the slider 12 to the housing 19 in the event the user does not slide the slider 12 sufficiently towards the housing 19.

The strength of the magnets or magnetizable materials are sufficient to attract the slider 12 to connect to the housing 19 immediately upon unlocking, but not so strong that the magnets or magnetizable materials prevent the slider 12 from reaching its extended locked position. The housing 19 and lock slider 12 are either at a predetermined or adjustable distance away from each other such that immediately upon unlocking, i.e., immediately upon moving the slider 12 from the first position illustrated in FIG. 2A to the second position illustrated in FIG. 2B, the magnets or magnetizable materials 14_a_ and 14_b_ of slider 12 contact the magnets or magnetizable materials 18 of the housing 19. This avoids the possibility that when the user unlocks the stall door 100 the slider 12 will not move all the way into the second position, preventing the slider 12 from initiating the process for the signal emitter 1 to emit a signal to be received by the flush signal receiver 3 to initiate the events leading to a flushing. In other words, by fully reaching the second position, which is ensured with the magnets, the sensor 4 adequately senses the presence of the slider 12 in the second position so that a flush signal is emitted by signal emitter 1 to flush signal receiver 3, regardless of the type sensor, for example, the sensors disclosed above, that is being used.

The electronic circuitry for the electronic components inside the housing 19 may be powered by either one or more photovoltaic cells 23 or by one or more batteries 25 housed in housing 19, for example. The electronic circuitry for the flushing mechanism 112 including the flush signal receiver 3, the toilet flushing controller 16, and the toilet flushing actuator 5 may be powered by either one or more photovoltaic cells or by one or more batteries.

In one embodiment of the invention, the toilet flushing controller 16 and/or the door housing controller 27 is configured to implement a programmable time delay that is introduced to set minimum intervals between flushes, preferably ranging from, but not limited to, 1-5 seconds, 1-10 seconds, 5-25 seconds, 5-50 seconds, 25-50 seconds, 50-100 seconds, 100-200 seconds, 150-250 seconds, preferably, 5 to 240 seconds. The programmable time delay setting minimum intervals between flushes may also be set to be less than 5 seconds or more than 240 seconds. The programmable time delay can be manually programmed, or determined through an algorithm that uses machine learning or deep learning techniques to determine an optimal time interval. The programmable time delay prevents users from repeatedly flushing the toilet in short intervals of time by repeatedly switching the slider 12 of the stall locking member 110 back and forth between locked (first position) and unlocked positions (second position). Managers of the bathroom will be able to manipulate the time delay range at their discretion with a system controller (not shown) for example, a computer, a mobile application, or a combination of various electronics and/or computer based technology.

In one embodiment, a system controller (not shown) may be specific to one toilet, alternatively to all the toilets in the same bathroom, or central to all the toilets in the entire building, but with the ability to regulate the time delay in each or every individual toilet.

In a particular embodiment, a different time delay may be appropriate for a handicap toilet as opposed to a regular toilet because the handicap toilet may be used differently from a non-handicap toilet. The system controller measures how many times the toilets flush, allowing the facility manager to collect data and adjust settings to maximize water efficiency. The system controller sends data to the flush signal receiver wirelessly via Bluetooth® or radio frequency, for example. Also a required daily flush for toilets that were not used can be programmed into the system 10 to keep toilets clean. The system controller records the frequency of slider operation.

What is claimed is:

1. A method of managing toilet flushing in a bathroom stall, comprising:

receiving a wireless signal from a signal emitter in a stall door latch, the wireless signal indicating an instance of an unlocking of the stall door latch; and triggering a flushing actuator to initiate flushing of a toilet in response to receiving the wireless signal without sensing an open or closed state of the stall door.

2. The method of claim 1, wherein the wireless signal indicates only the instance of the unlocking of the stall door latch.

3. The method of claim 1, wherein the unlocking of the stall door latch comprises a retraction of a slider in the stall door latch.

4. The method of claim 1, wherein the triggering is controlled by controller circuitry coupled to the flushing actuator and coupled to receiver circuitry configured for receiving the wireless signal.

5. The method of claim 4, further comprising monitoring a frequency of operation of the slider by the controller circuitry based on the frequency of receiving the wireless signal by the receiver circuitry.

6. The method of claim 4, further comprising counting by the control circuitry a number of times that the toilet has been flushed based on a number of times that the control circuitry has triggered the flushing actuator.

7. The method of claim 6, further comprising waiting for at least a minimum delay period to elapse between consecutive triggering of the toilet flushing actuator by the control circuitry.

8. The method of claim 7, further comprising determining the minimum delay period by the controller circuitry based at least in part on the frequency of slider operation.

9. The method of claim 8, further comprising determining the minimum delay period by the controller circuitry based at least in part on the number of times that the toilet has been flushed.

10. The method of claim 1, wherein triggering the flushing actuator requires only one sensor.

11. A system of managing toilet flushing in a bathroom stall, comprising:

a door locking member, including:

a door lock chamber, a slider capable of translating from a first position to a second position, the slider comprising a first end and a second end opposite the first end, wherein the slider first end in the first position is inserted in the door lock chamber and the slider first end in the second position is free of the door lock chamber, a sensor configured for sensing the slider when the slider is in the second position;

a signal emitter operatively connected to the sensor and configured to send a wireless signal to a flush signal receiver upon sensing by the sensor that the slider has been moved to the second position, wherein the flush signal receiver is configured to receive the wireless signal from the signal emitter in a stall door latch, the wireless signal indicating an instance of an unlocking of the stall door latch; and a toilet flushing controller operatively joined to the flush signal receiver; and a toilet flushing actuator controlled by the toilet flushing controller, wherein the flushing actuator initiates flushing of a toilet in response to receiving the wireless signal without sensing an open or closed state of the stall door.

12. The system of claim 11, wherein the wireless signal indicates only the instance of the unlocking of the stall door latch.

13. The system of claim 11, wherein the unlocking of the stall door latch comprises a retraction of a slider in the stall door latch.

14. The system of claim 11, wherein the triggering is controlled by controller circuitry coupled to the flushing actuator and coupled to receiver circuitry configured for receiving the wireless signal.

15. The system of claim 14, further comprising monitoring a frequency of operation of the slider by the controller circuitry based on the frequency of receiving the wireless signal by the receiver circuitry.

16. The system of claim 14, further comprising counting by the control circuitry a number of times that the toilet has been flushed based on a number of times that the control circuitry has triggered the flushing actuator.

17. The system of claim 16, further comprising waiting for at least a minimum delay period to elapse between consecutive triggering of the toilet flushing actuator by the control circuitry.

18. The system of claim 17, further comprising determining the minimum delay period by the controller circuitry based at least in part on the frequency of slider operation.

19. The system of claim 18, further comprising determining the minimum delay period by the controller circuitry based at least in part on the number of times that the toilet has been flushed.

20. A method of triggering a flushing actuator on a toilet, the method comprising;

sensing a retraction of a slider in a toilet stall door latch; and transmitting a wireless signal by a transmitter incorporated with the stall door latch, the wireless signal indicating only that a retraction of the slider has been sensed;

wherein control circuitry receives the wireless signal and selectively initiates a flush of the toilet based at least in part on a frequency of the retraction of the slider without sensing an open or closed state of the stall door.

* * * * *